DEVICE EMITTING ELECTRICAL PULSES FOR REGULATING PURPOSES

Filed Feb. 28, 1951 3 Sheets-Sheet 1

INVENTOR.
MARCEL TOULY
BY [signature]
ATTORNEY.

INVENTOR.
MARCEL TOULY
BY [signature]
ATTORNEY

May 31, 1955 M. TOULY 2,709,756
DEVICE EMITTING ELECTRICAL PULSES FOR REGULATING PURPOSES
Filed Feb. 28, 1951 3 Sheets-Sheet 3

INVENTOR.
MARCEL TOULY,
BY [signature]
ATTORNEY.

United States Patent Office 2,709,756

Patented May 31, 1955

2,709,756

DEVICE EMITTING ELECTRICAL PULSES FOR REGULATING PURPOSES

Marcel Touly, Boulogne sur Seine, France, assignor to Societe Dite: Hewittic, societe a responsabilite limitee siege social, Suresne, France Application February 28, 1951, Serial No. 213,080

Claims priority, application France March 6, 1950

18 Claims. (Cl. 307—73)

The present invention relates to regulating devices and is particularly directed to a device for emitting regulating electrical pulses in response to variations in a factor of the apparatus to be regulated.

It is known that a regulator emitting regulating impulses of a variable character can be constructed, the period of the impulses being proportional to the deviation of some factor to be corrected, the sense of the impulses being regulated to the sense of the deviation.

The present invention relates to a new arrangement of such a regulator which is particularly simple and satisfactory.

Figure 1:
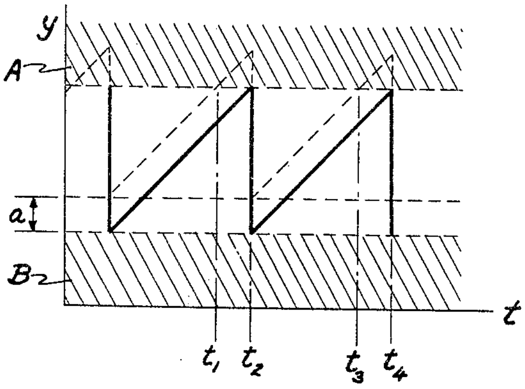
Fig. 1 is a graphic representation of the principle of operation of regulating devices embodying this invention.

Referring initially to Fig. 1 a saw-tooth oscillatory voltage is there graphically represented, the ordinates $y$ indicating voltages while the abscissas represents the time $t$.

In accordance with the present invention, the represented voltage acts on relays which close one or more circuits when the saw tooth oscillatory voltage encroaches upon the hatched regions which represent the zones of operation of the respective relays. Thus the zone A may correspond to a relay which effects control in one direction, and the zone B to the relay which effects control in the opposite direction. When the oscillatory voltage is as represented in full lines on Fig. 1, corresponding to a normal condition, the zones A and B are free of encroachment and both associated relays remain open.

If a continuous voltage $a$ is superposed on the saw-tooth voltage, the latter is displaced upwardly, as represented by the broken line and encroaches on the zone A and the corresponding relay circuit closes from $t_1$ to $t_2$, then from $t_3$ to $t_4$ and so on, the period of each pulse being substantially proportional to the extent of the deviation $a$. When the deviation $a$ is equal to the distance which separates the zones A and B the corresponding relay circuit is permanently closed.

If the displacement of the saw tooth oscillatory voltage is in the opposite direction, it is in the zone B that encroachment occurs and the related relay is intermittently closed, so that the relay which is closed depends upon the direction of displacement of the voltage, and the lengths of the periods of closure of one relay or the other depend upon the extent of such displacement.

Figure 2:
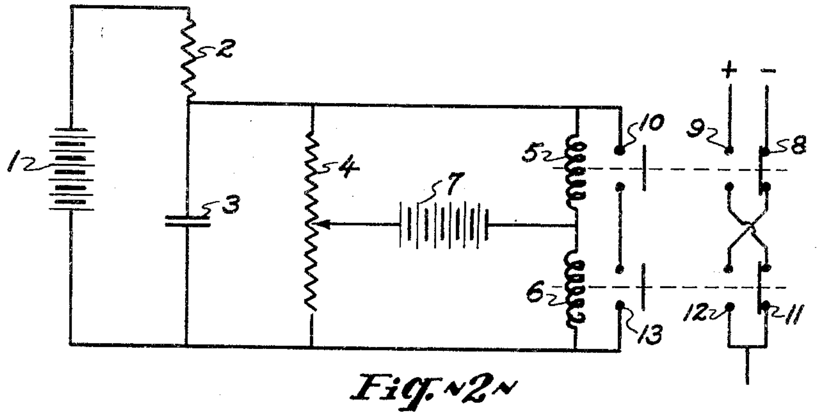
Fig. 2 is a wiring diagram of a regulating device embodying this invention.

Fig. 2 shows a first embodiment of the invention.

A source of constant voltage 1 charges a condenser 3 through a resistance 2. A potentiometer 4 is connected across the condenser, and two relays 5 and 6 of similar sensitivity are connected in series with each other and in parallel with the potentiometer, and comprise respectively a series of contacts 8, 9 and 10, and 11, 12 and 13 connected as shown on the drawing. The contacts 10 and 13 are connected in series, while the contacts 8 and 12 and the contacts 9 and 11 are cross-connected in series. Thus, the control circuit — is closed only when contacts 8 and 12 are simultaneously closed, and the control circuit + is completed only when the contacts 9 and 11 are simultaneously closed. However, by reason of the crossing of the connections, circuit — is completed only when relay 5 is open and relay 6 is closed, while circuit + is completed when relay 5 is closed and relay 6 is open. The contacts 10 and 13 may close simultaneously to discharge the condenser, while the other contacts permit the transmission of regulating pulses to the circuits marked + or —.

The voltage characterising the deviation to be corrected is represented at 7 and is here indicated for example as a battery. When this voltage 7 is zero, the relays 5 and 6 close simultaneously in response to the build-up of the voltage at the terminals of the condenser to a sufficient value. This closes the contacts 10 and 13 so that the condenser discharges and the relays are thereafter released and stop the discharge and the cycle recommences. This part of the circuit may be regarded as a typical elementary oscillator. If the relays have slight differences in their characteristics, this may be corrected, for example by manipulation of the potentiometer 4. Since relays 5 and 6 are in phase, the contacts 8, 9, 11, 12 are simultaneously operated and no pulse is emitted in either of the control circuits + or —. When the voltage 7 becomes operative it disturbs the current equilibrium in the relays 5 and 6, the current flowing through one of the relays being increased and the corresponding relay closes sooner, while the current through the other relay is reduced and that other relay closes later. There is thus a change of phase between the time of operation of the relays so that there are periods when one of the relays is closed and the other is open and current passes either into the circuit + or into the circuit —. The pulsing current in circuit + or in circuit — may then be used to control a device for regulating the apparatus producing the deviation or variation in voltage 7. These control devices and the apparatus producing the variation of voltage 7 are no part of this invention and have not been illustrated or described in detail.

An advance in the phasing of the relay 5, results in a pulsing current through the circuit controlled by the contacts 9 and 11, while phase advance of the relay 6 results in a pulsing current through the circuit controlled by the contacts 8 and 12.

In summarizing the operation of the embodiment of the invention illustrated in Fig. 2, it should be noted that the two relays 5 and 6 are fed with alternating currents which are in phase, so long as the control characteristic, that is the voltage 7, does not deviate from the predetermined norm. The two sets of contacts 8 and 9, and 11 and 12, which are interposed in the related pulse emitting control circuits, are connected so that no current flows in the pulsing emitting circuits so long as the voltage fed to the relays 5 and 6 are in phase to cause simultaneous opening and closing of the relays. However, when the voltages fed to the relays 5 and 6 are out of phase, by reason of the deviation of the voltage 7 from the predetermined norm, the contacts 8 and 9, and 11 and 12, operated by the relays 5 and 6, respectively, are effective to intermittently complete one of the control circuits thereby permitting electrical impulses to flow in that control circuit. If the voltage 7 exceeds the predetermined norm, one of the relays 5 and 6 will be closed or energized in advance of the other of the relays, while, if the voltage 7 is lower than the predetermined norm, the other of the relays 5 and 6 will be first energized. Thus, the deviation of the voltage or characteristics 7 will determine which of the pulse emitting circuits is to be closed or energized. Further, as illustrated in Fig. 1, the larger the deviation of the characteristics of voltage 7 from the predetermined norm, the longer will be the intervals during which the switches 8 and 12, or 9 and 11, are simultaneously closed so that the duration of the pulsing current in one or the other of the control circuits is a function of the magnitude of the deviation of the characteristics from the predetermined norm.

Numerous variations in this circuit are possible, the common characteristic being that two relays are fed with an alternating, particularly a saw tooth voltage, with all changes in the sensitivity of the relays or the values of the circuit elements, producing a change in phasing of the intermittent operation of the relays.

Figure 3:
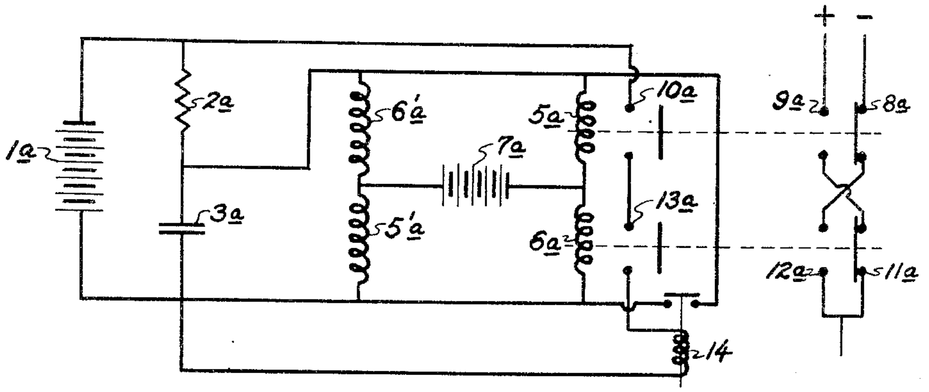
Fig. 3 is a wiring diagram of a modification of the device shown in Fig. 2.

Fig. 3 for example shows a circuit wherein the parts corresponding to those described above in accordance with Fig. 2 are identified by the same reference numerals with the letter "*a*" appended thereto, and the condenser discharge circuit is controlled by an intermediate relay 14 controlled by the contacts 10*a* and 13*a*. If desired, the arrangement shown in Fig. 3 may be modified slightly, in a manner not shown in the drawings, by connecting the coil of relay 14 directly to the terminals of the condenser 3*a*, and, in this case it is necessary to regulate the sensitivity of the relay 14 as a function of the sensitivity of the other relays. The above modification of Fig. 3 can be effected merely by changing the connection of the line extending from the contact 10*a* to a junction between the source 1*a* and resistance 2*a* so that such line extends to a junction between the resistance 2*a* and the condenser 3*a*. The relays each comprise two separate windings 5*a* and 5'*a*, and 6*a* and 6'*a* which increases the sensitivity of the system.

The unbalancing of the system may be obtained in various ways other than the introduction of a deviation voltage, as at 7 and 7*a* in Figs. 2 and 3, respectively. For example, the deviation of the controlled device from a predetermined norm may shift the slider of the potentiometer 4 (Fig. 2), the voltage 7 not then being used.

Figure 4:
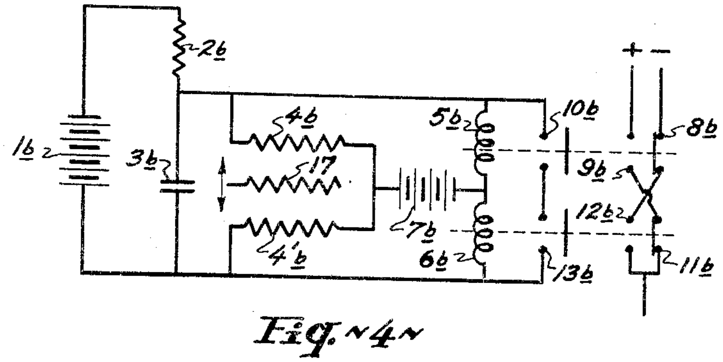
Fig. 4 is a wiring diagram of another modification of the device shown in Fig. 2.
Figure 5:
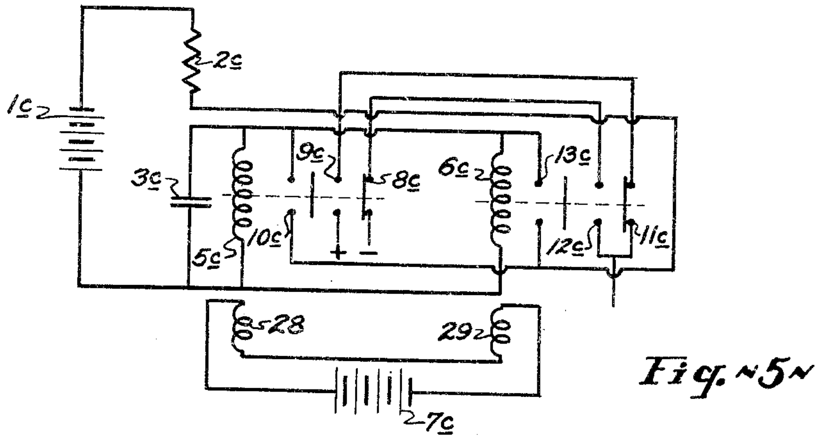
Fig. 5 is a wiring diagram of another embodiment of the invention.

It is also possible to replace the variable potentiometer 4 of Fig. 2 by potential divider resistances varying more or less as a function of temperature, light flux or any other factor in response to which it is desired to set up a control current. There is thus obtained a pulsing regulator or control current for temperature, for light or for any other factor or characteristic of an associated machine. The embodiment shown in Fig. 4 includes resistances 4*b* and 4'*b* varying with temperature and disposed at opposite sides of a heating resistance 17, and the other parts of the circuit are similar to those described in connection with Fig. 2 and are identified by the same reference numeral with the letter "*b*" appended thereto. Any displacement of the resistance 17 in response to variation of the controlled device from the predetermined norm, suffices to disturb the equilibrium of the system and produces the emission of pulses. It is to be noted that the relays 5*c* and 6*c* may be connected in parallel, as in the embodiment of Fig. 5, instead of being connected in series as in Fig. 2, and the change in equilibrium of the relays 5*c* and 6*c* is then obtained by means of separate windings 28 and 29 which are energized from a source 7*c* varying with the deviation of the controlled device from the predetermined norm. The constant voltage source 1*c* feeds the condenser 3*c* through the resistance 2*c* and the simultaneous closing of the relays 5*c* and 6*c* produces discharge of the condenser 3*c*.

Figure 6:
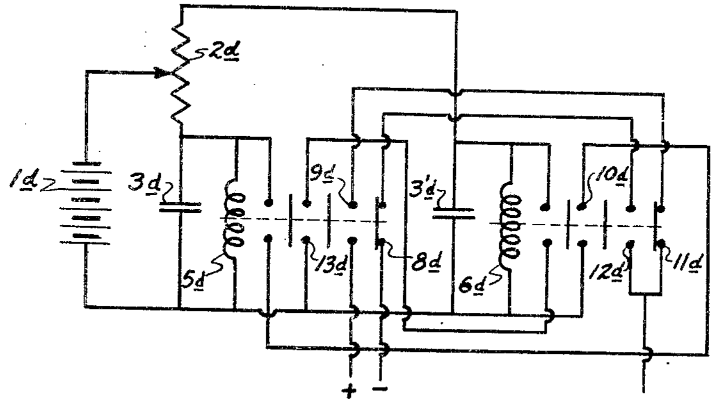
Fig. 6 is a wiring diagram of still another embodiment of the invention.

The phasing change of the relays, which is an important characteristic of the invention may also be obtained by the arrangement illustrated in Fig. 6.

The constant voltage source 1*d* charges the condensers 3*d* and 3'*d* through a potentiometer 2*d*, the relays 5*d* and 6*d* being connected in parallel to the condensers 3*d* and 3'*d*, respectively. The simultaneous discharge of the condensers 3*d* and 3'*d* through the series connected contacts 10*d* and 13*d* is only obtained when the two relays 5*d* and 6*d* are both closed. The relays 5*d* and 6*d* comprise, as in all the foregoing embodiments, interconnected contacts 8*d* and 9*d*, and 11*d* and 12*d*, for intermittently completing one or the other of the control circuits + and — in response to displacement of the slide of potentiometer 2*d*. When the potentiometer 2*d* has its slide disposed at the center thereof, the circuit is symmetrical, and the relays 5*d* and 6*d* operate in phase so that no pulse is emitted in either of the control circuits. However, if the slide of the potentiometer is displaced from the center thereof, by deviation of the controlled device from the predetermined norm, pulses of variable duration are immediately emitted in one or the other of the control circuits.

Figure 7:
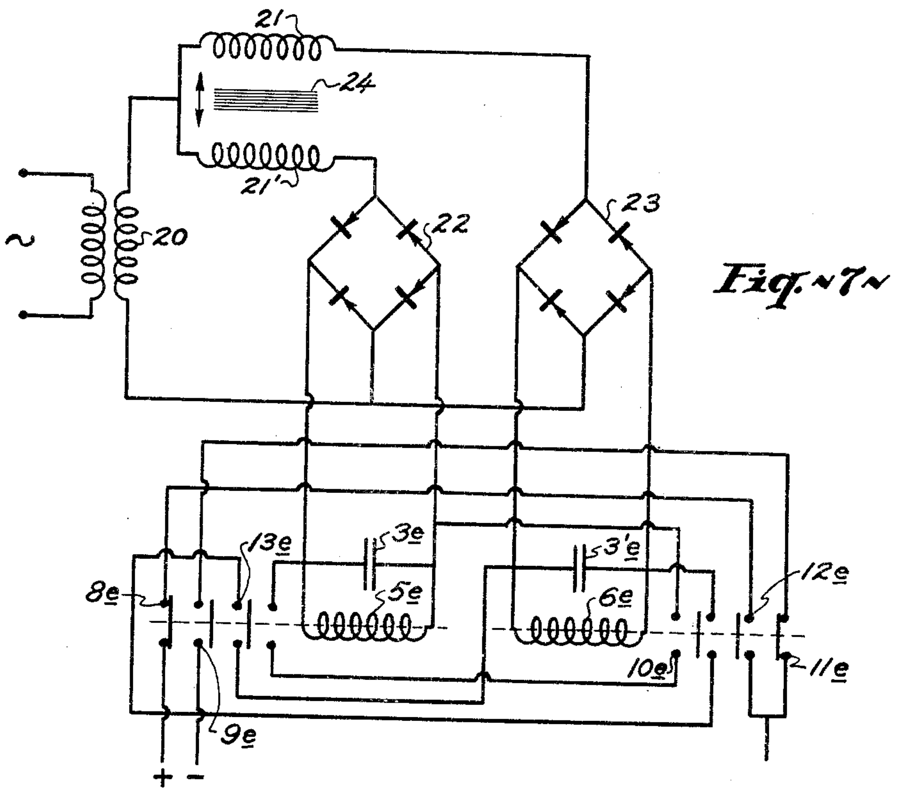
Fig. 7 is a wiring diagram of still another embodiment of the invention.

In the embodiment of Fig. 7, operation is effected with alternating current, the resistance 2 of Fig. 2 being replaced by two parallel connected inductances 21 and 21' fed by the transformer 20. Rectifiers 22 and 23 are energized through the inductances 21' and 21, respectively, and feed the condensers 3, 3*e* and 3'*e* and the relays 5*e* and 6*e*, which are connected in parallel with the condensers 3*e* and 3'*e*, respectively. The relays 5*e* and 6*e* control the contacts 8*e* and 9*e*, and 11*e* and 12*e*, respectively, which are cross-connected, like those of Fig. 2, to control the intermittent closing of the control circuits + and —. If the inductances 21 and 21' are identical no impulse is emitted, the least asymmetry between the inductances caused by a variation in the factor being controlled results in the emission of pulses in one or the other of the control circuits. Such asymmetry may be produced by an iron core 24 which is normally disposed equi-distant between the inductances 21 and 21' and which is displaced toward one or the other of the inductances in response to variation of the controlled device from the predetermined norm.

Finally it may be necessary to operate at a very low rate if the elements to be adjusted have a very low speed of reaction, that is, if the exertion of a controlling action produces the required adjustment very slowly.

Figure 8:
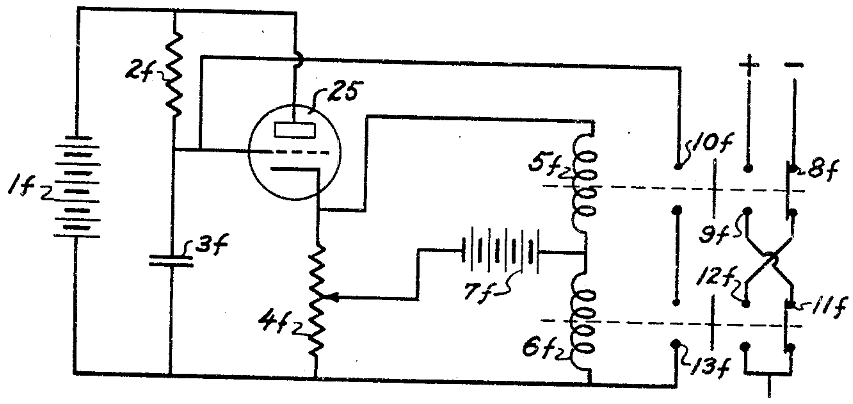
Fig. 8 is a wiring diagram of still another embodiment of the invention.

In this case the system will be brought into circuit for a very short time and then put out of circuit, by a time switch. A large time constant may be obtained directly by the system illustrated in Fig. 8, which is a modification of that shown in Fig. 2, and wherein the same reference numerals with the letter "*f*" appended thereto, identify the corresponding elements. The condenser 3*f* is fed by a vacuum tube 25 connected with full negative feedback, and the relays 5*f* and 6*f* discharge this condenser. The time constant of the circuit determined by the condenser 3*f* and the resistance 2*f* may be considerably increased by the fact that the condenser 3*f* is no longer shunted by the potentiometer 4*f* and the relays 5*f* and 6*f*.

The regulating pulses in the control circuits of the various embodiments may be used for adjusting various elements such as valves, induction regulators, tapping switches, brush-shifting devices, rheostats, mechanical adjusters and so on.

Finally the invention is in no way changed if a voltage curve other than a saw tooth oscillating voltage is used, the latter being most simply obtained with an elementary oscillator and being most satisfactory.

What I claim is:

1. An electric device for emitting pulsing currents at a fixed rhythm, the direction of the emitted pulsing currents being linked with that of the deviation of a characteristic from a predetermined norm while the duration of the pulsing currents is a function of the magnitude of the deviation; said device comprising two operatively associated circuits having identical characteristics and feeding alternating voltages to two electro-magnetic relays having the same sensitivity and each actuating the same number of contacts, two of said contacts of each relay being interposed in pulse-emitting circuits, the two contacts of one relay being connected in series with the two corresponding contacts of the other relay in such a way that the pulse-emitting circuit which is to go into action is completed only when said relays beat with a predetermined phase displacement, and means for displacing the phases of said alternating voltages fed to said relays in response to the deviation from a predetermined norm.

2. An electric device according to claim 1; wherein said two operatively associated circuits for feeding alternating voltages to said relays include a common source of direct current, a condenser and resistance in series with said source, additional contacts actuated by said relays and connected in series, and means connecting said additional contacts across said condenser so that said condenser alternately charges and discharges as said relays open and close said additional contacts.

3. An electric device according to claim 1; wherein said two operatively associated circuits for feeding alternating voltages to said relays include a common source of direct current, a condenser and resistance connected in series with said source, a shunt circuit connected across said condenser and including an intermediate relay, additional contacts actuated by the first mentioned relays and connected in series, and means connecting the winding of said intermediate relay in series with said additional contacts and across said source so that said condenser alternately charges and discharges as said first mentioned relays open and close said additional contacts to open and close said intermediate relay.

4. An electric device according to claim 2; wherein each of said two operatively associated circuits includes the winding of the related one of said relays and a portion of the winding of a potentiometer, means connecting the outer end of each portion of said potentiometer to one end of the winding of the related relay and connecting the other ends of the windings of said relays to each other, and said means for displacing the phases of the alternating voltages imposes a voltage characteristic of the deviation from a norm between a midpoint on said potentiometer and the connection of said other ends of the relay windings thereby displacing the phase of the alternating voltages imposed across said windings.

5. An electric device according to claim 4; wherein each of said portions of a potentiometer consists of a second winding connected in parallel with each of said windings of the relays.

6. An electric device according to claim 4; wherein the last mentioned means includes a runner movable along said potentiometer, the movement of said runner corresponding to the deviation from a norm.

7. An electric device according to claim 6; wherein said last mentioned means includes a constant direct current source in series with said runner between said potentiometer and said connection between the windings of the relays.

8. An electric device according to claim 4; wherein each of said portions of the potentiometer consists of a separate resistance the value of which varies in response to the deviation from a norm.

9. An electric device according to claim 8; wherein the value of said separate resistances are made to vary in accordance with the deviation by the action of a heating resistance operatively associated therewith.

10. An electric device according to claim 2; wherein the windings of said relays are connected in parallel with each other and with said condenser, means connecting a contact of each of said relays in parallel between said condenser and said resistance in a manner so that charging of the condenser is interrupted when the last mentioned contacts of both relays are simultaneously closed; and wherein said means for displacing the phases of the alternating voltages includes an auxiliary winding on each relay in suitable winding direction in relation to the main winding thereof, said auxiliary windings being identical and connected in series to form a circuit in which an electric current characteristic of the deviation from a norm may be made to act.

11. An electric device for emitting pulsing currents in response to the deviation of a characteristic from a predetermined norm; said device comprising two electromagnetic relays having the same sensitivity, means feeding alternating voltages of the same frequency and normally in phase to said relays, each of said relays including first and second fixed contacts and a movable contact engageable alternately with said first and second fixed contacts as the related relay is energized and de-energized, respectively, by the alternating voltage imposed thereon, two pulse-emitting circuits, one of said pulse-emitting circuits having the first fixed contact of one of said relays and the second fixed contact of the other of said relays connected in series therein, the other of said pulse-emitting circuits having the second fixed contact of said one relay and the first fixed contact of said other relay connected in series therein whereby said pulse-emitting circuits are completed only when the energization of said relays is out of phase, and means for displacing the phases of said alternating voltages fed to said relays in response to the deviation of a characteristic from a predetermined norm.

12. An electric device according to claim 11; wherein said means feeding alternating voltages to the relays includes a condenser connected in paralled with the winding of each of said relays, a common source of direct current, a potentiometer having a runner movable therealong to divide the resistance thereof into two portions, means connecting each of said condensers in series with a related portion of the divided resistance of said potentiometer, means connecting said source in series between said condensers and said runner, each of said relays having additional contacts connected in series as relay guards and, when closed, causing the periodic short circuiting of said condensers.

13. An electric device according to claim 12; wherein said means displacing the phases of the alternating voltages acts to move said runner along the potentiometer.

14. An electric device according to claim 12; wherein said means displacing the phases of the alternating voltages varies the ratio of the values of the capacities of said condensers.

15. An electric device according to claim 11; wherein said means feeding alternating voltages to said relays includes a source of alternating current, two identical rectifiers each connected in series with an induction coil and feeding a condenser of like capacity, means connecting said induction coils in parallel and to said source of alternating current, each condenser being connected to the winding of a related relay, each of the circuit units formed by an induction coil, rectifier, condenser and relay winding being identical when the values of the inductances are the same, each of said relays actuating additional contacts connected in series and acting as relay guards to cause, when closed, the periodic shoft-circuiting of said condensers; said means for displacing the phases of the alternating voltages being effective to vary the ratio of the values of the inductances of said induction coils.

16. An electric device according to claim 1; wherein said means feeding alternating voltages to said relays includes a source of constant direct current, a resistance and condenser connected in series across said source, means connecting the windings of said relays in series with each other and across said condenser, a third fixed contact associated with each of said relays and engaged by the related movable contact when the relay is energized, means connecting said third fixed contacts in series and across said condenser to short-circuit the latter when said third contacts are closed, and bridge means including a potentiometer connected in parallel with said condenser, a tap connecting to said potentiometer intermediate its ends to divide the potentiometer into two resistance portions each connected in series with the winding of a relay, said means for displacing the phase of the alternating voltages being interposed between said tap and said means connecting the windings of the relays in series with each other and constituting the diagonal of the bridge means.

17. An electric device according to claim 16; including a triode tube interposed between said bridge means, at the junction of a resistance portion and related relay winding, said condenser being interposed in the grid circuit of the triode tube and the anode of said tube being connected to said bridge means to feed the latter.

18. An electric device according to claim 17, including push-pull means connecting said anode of the triode tube to said bridge means.

References Cited in the file of this patent

UNITED STATES PATENTS 2,255,816 Rotscheidt ------------- Sept. 16, 1941